Figure 1:
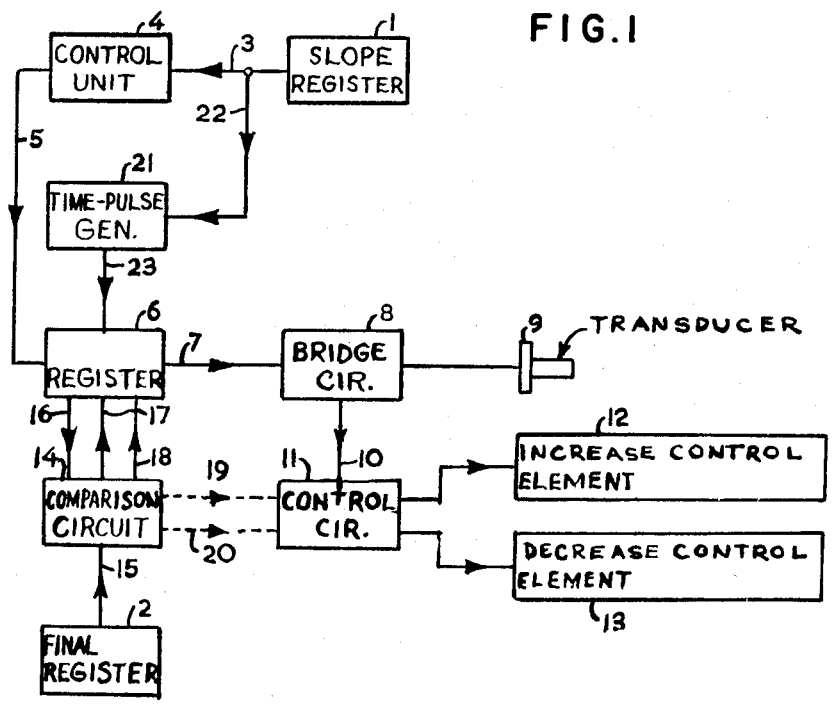

United States Patent
Mienstaedt

[15] 3,674,993

[45] July 4, 1972

[54] CONTROL CIRCUIT ARRANGEMENT FOR CONTROLLING PARAMETERS OF A PROCESS AND A COMPARISON CIRCUIT ARRANGEMENT FOR USE IN CONJUNCTION WITH THE CONTROL CIRCUIT ARRANGEMENTS

[72] Inventor: Robert Mienstaedt, Spartanburg, S.C.
[73] Assignee: Deering Milliken, Inc.
[22] Filed: July 15, 1968
[21] Appl. No.: 46,563

[52] U.S. Cl..........................................235/150.1, 318/601
[51] Int. Cl. ..........................................................G05b 19/02
[58] Field of Search..............................318/567; 235/151.1

[56] References Cited

UNITED STATES PATENTS

| | | |
|---|---|---|
| 3,344,260 | 9/1967 | Lukens..............................235/151.11 |
| 3,303,332 | 2/1967 | Gotz..................................235/151.11 |
| 3,392,914 | 7/1968 | Nienstaedt..............................236/46 |
| 3,382,352 | 5/1968 | Yetter..................................235/151.1 |

*Primary Examiner*—Eugene G. Botz
*Attorney*—Norman C. Armitage and H. William Petry

[57] ABSTRACT

A control circuit arrangement for controlling parameters of a process in which information concerning a processing condition is contained in a register, and in which information concerning the rate by which the condition is to vary, e.g., the slope information, is supplied to a control unit controlling the register. The register is a digital register and the control unit is arranged to supply a pulse to the register each time a period, depending on the slope information, has elapsed whereby the register will alter its contents by a certain value in a direction determined by the desired find condition.

5 Claims, 24 Drawing Figures

CONTROL CIRCUIT ARRANGEMENT FOR CONTROLLING PARAMETERS OF A PROCESS AND A COMPARISON CIRCUIT ARRANGEMENT FOR USE IN CONJUNCTION WITH THE CONTROL CIRCUIT ARRANGEMENTS

This invention relates to a control circuit arrangement for controlling parameters of a process where information as to a processing condition at any time is contained in a register, and in which information concerning the rate by which the condition is to vary, the slope information, is supplied to a control unit controlling the register.

Often it is desirable to have the possibility of controlling the parameters of a process according to a specific program not only so that the processing condition is as quickly as possible brought from one value to another but also so that the change is effected at a specific rate, or in other words so that a curve indicating the change as a function of time has a specific slope. In a known circuit arrangement of said type, a temperature register is constituted by a potentiometer, whilst the control unit is a motor driving the potentiometer arm. Different slopes are produced by giving the motor different speeds of revolution. However, it is difficult to obtain several, each independently highly well-defined numbers of revolutions of a motor, and therefore well-defined slopes can only be obtained with great difficulties.

The present invention has for its object to provide a circuit arrangement in which said disadvantages are remedied.

For obtaining the said object, the circuit arrangement according to the invention is characteristic in that the register is a digital register, and that the control unit is so arranged as to supply a pulse to the register each time a period depending on the slope information has elapsed, whereby the register will alter its contents by a certain value in a direction determined by the desired final condition. As it is easy to produce pulses having a very exact repetition frequency it is possible when using the measures according to the invention to obtain a number of exactly defined slopes by simple means. The choice of slope may be effected manually, for example by means of push-buttons, or automatically for example by means of a program carrier, if desired in conjunction with a register.

The slope information may expediently be constituted by binary numbers, and in that case the control unit according to the invention may comprise a binary counter and a timing pulse generator adapted to advance said counter, means being present to supply said pulse to the register, and to reset the counter when said counter has reached a certain number depending on the slope number. By choosing the repetition frequency of the pulses from the timing pulse generator sufficiently high, it is in this case possible by particularly simple means to obtain exactly the slopes desired.

The coding of the desired slopes may according to the invention expediently be obtained by the outputs of the binary counter being connected in a pattern which depends on the desired variation rates, to inputs of a number of AND-circuits, the remaining inputs of which are supplied with voltages depending on the present slope number, the outputs of the AND-circuits being connected to inputs of an OR-circuit, the output of which is connected, as the case may be via an amplifier and a pulse shaper, to the register and to the means for resetting the binary counter. When the binary counter has come to the number corresponding to the slope number set, all the inputs to the AND-circuit which correspond to the slope concern, will be supplied with a signal which via the OR-circuit influences the register so that said register alters its contents, as well as the binary counter which is reset and commences counting afresh. Thus, it sill be seen that the register alters its contents by the said specific value, which for example may be the value 1, each time the binary counter has reached the number corresponding to the slope number concerned, i.e., each time a specific period has elapsed.

The circuit arrangement may according to the invention expediently comprise a number of change-over switches, the positions of which represent the slope number, said switches being connected to said remaining inputs of the AND-circuits.

The circuit arrangement may be so arranged that at the slope zero it maintains the parameters of a process constant. Further, it may be so arranged that at the slope infinite it causes the quickest possible change to take place in the processing conditions. In the latter case, the circuit arrangement according to the invention may contain another time pulse generator for supplying pulses of a considerably higher repetition frequency than the pulses from the first-mentioned time pulse generator and means for connecting said other time pulse generator to the register in dependence on the slope number.

By the hereinbefore described circuit arrangement it is, as said, possible to obtain a number of different slopes of the changes or variations. However, the said measures do not afford the possibility of determining the sign of the slope, i.e., whether at each pulse to the register a specific value has to be added or subtracted. Consequently, it is therefore also necessary to provide information as to the sign of the slope. It will, for example, be possible to derive such information from the contents of the register and an information as to the desired final condition of the process concerned, both of said pieces of information occurring for example as binary numbers. Consequently, this invention also relates to a comparison circuit arrangement for indicating the ratio of magnitude of the two binary numbers, which circuit arrangement according to the invention is characterized by two terminals each supplied by a voltage via a resistor, the voltage condition of said terminals indicating whether the ratio of the two binary numbers to be compared is smaller than, equal to or greater than unity, said terminals forming each the starting point of a series of controllable switches, the condition of the $n'$ th switch in a series being determined by the voltage condition on the connecting point of the $(a-1)$'th and $n$'th switch in the other series and vice versa, the voltage condition of said connecting points being on the other hand determined by the $n$'th of a group of connections, of which there are two such groups having the first connection of each group connected to one of said terminals, whereas the $n$'th connection in a group is connected to the connecting point of the $(n-1)$'th and $n$'th switch is one of the series of controllable switches and the $n$'th connection of the other group is connected to the connecting point of the $(n-1)$'th and $n$'th switch in the other series of switches, each connection comprising two controllable switches which are controlled by the figures of the two binary numbers so that one switch in one connection is controlled by a figure of one of the numbers, and the other switch of the same connection is controlled by the figure of the same order in the other number, the controlling of the switches in the corresponding connection of the other group being controlled in a corresponding manner by the complements of said two figures of the numbers, the connections of lowest order being controlled by the figures of the highest order. Hereby a circuit arrangement is provided where the potential difference on the said terminals may assume a positive or negative value and consequently indicate whether the process is to proceed in one or the other direction, or the value 0 and consequently indicate the termination of the process, when the binary number determining the termination of the process is used for controlling one switch of each connection, whilst the other switches of the connections are controlled by the binary number provided during the process and indicating the value at present aimed at.

In an expedient embodiment of such comparison circuit arrangement according to the invention, the controllable switches in the two series of switches are constituted by the collector-emitter paths of transistors in which the emitter of one transistor is connected to the collector of the following transistor, the basis of each transistor being each connected to the connecting point in the other row determining the condition of the transistor via a resistor, the connections being all with their free ends connected to one point, each connection comprising the series connection of two controllable mechanical or electronic switches so controlled by the figures of the binary numbers that equal figures in the same positions in the two numbers will maintain the corresponding connections interrupted whereas different figures will cause one of the connections to be interrupted whilst the other one is closed.

Figure 2:
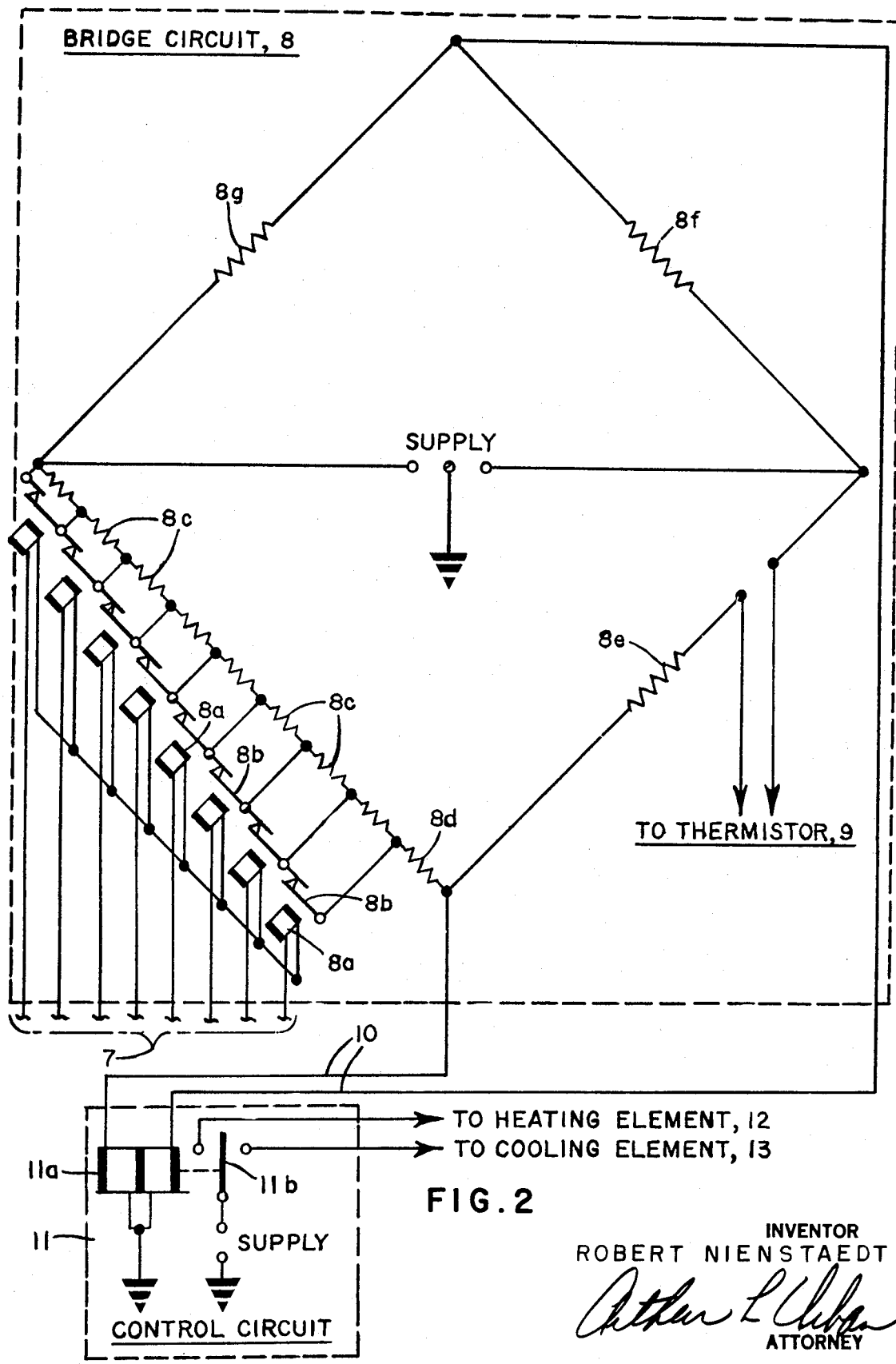
Figure 3:
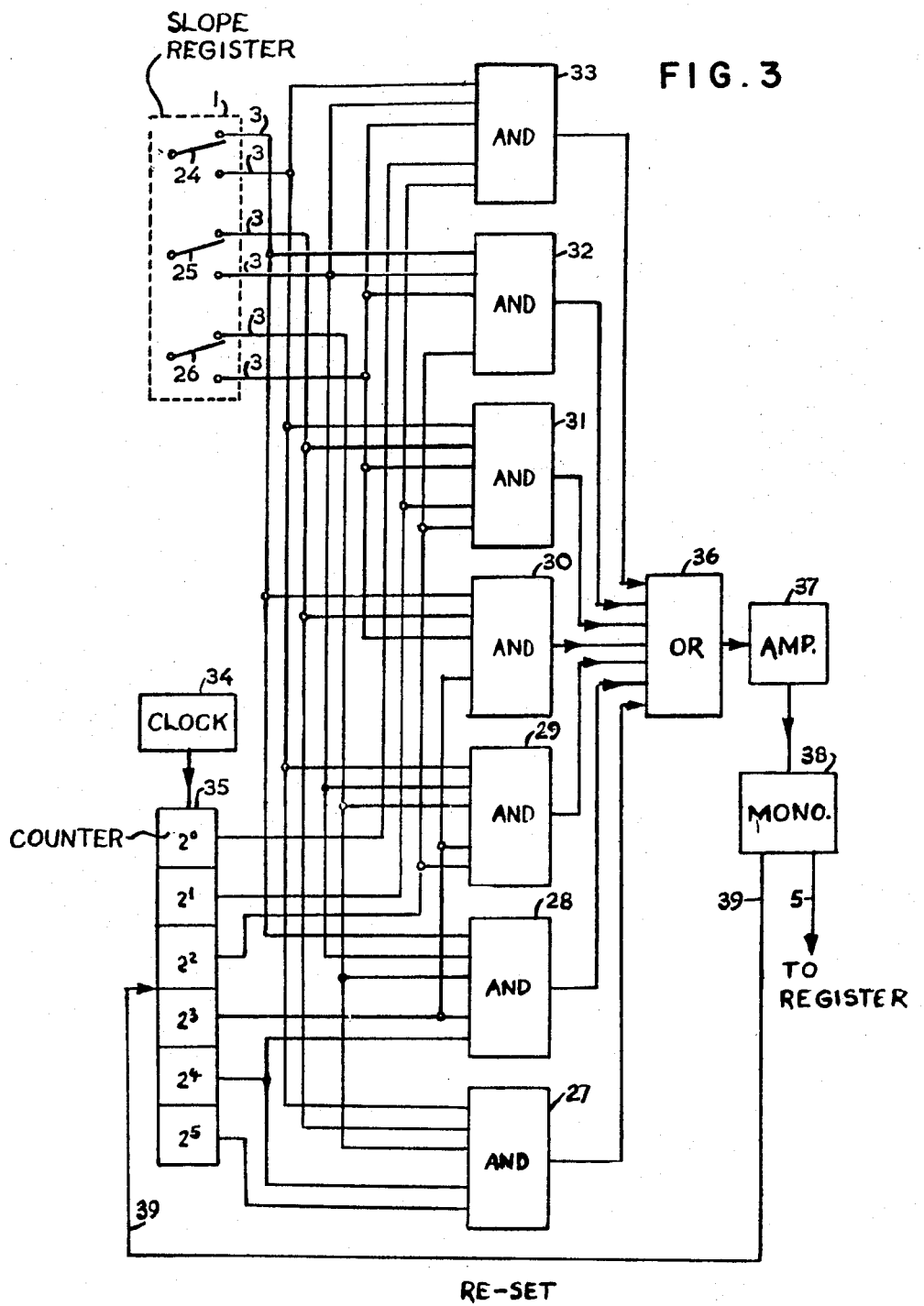
Figure 4:
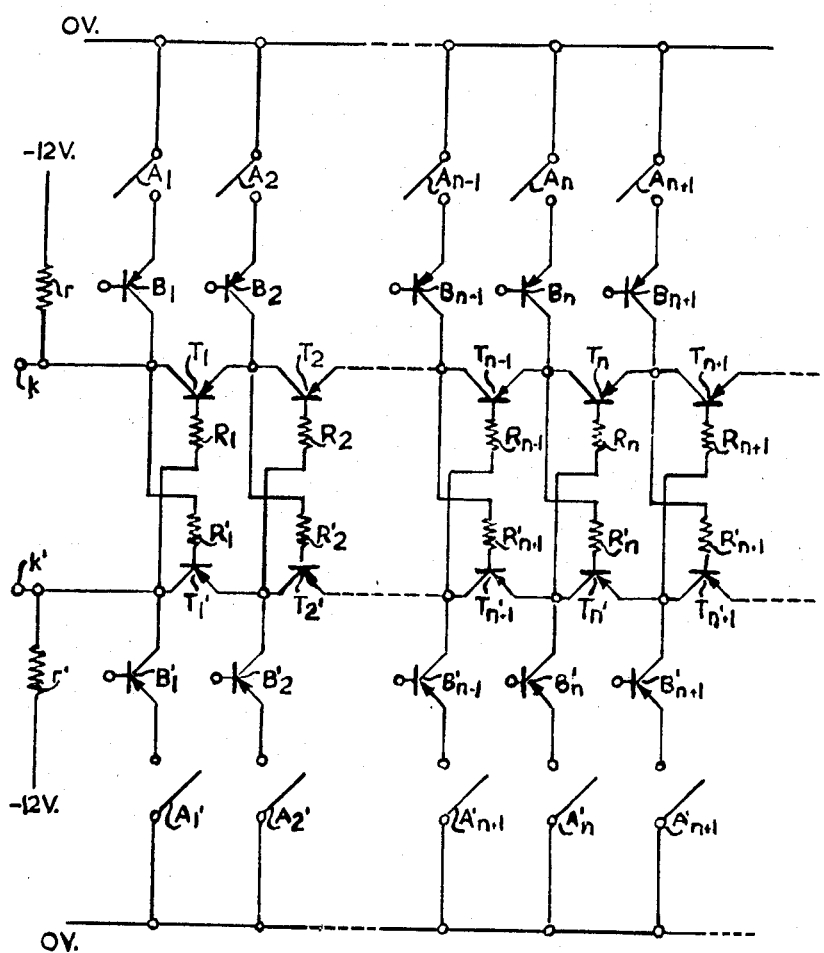

The invention will be particularly explained below with reference to the accompanying drawing, where FIG. 1 shows a block diagram of part of apparatus comprising a control circuit arrangement and a comparison circuit arrangement according to the invention, FIG. 2 is a more detailed circuit diagram of parts shown in block form in FIG. 1, FIG. 3 is a more detailed block diagram of an embodiment of the control circuit arrangement according to the invention, and FIG. 4 is a circuit diagram of an embodiment of the comparison circuit arrangement according to the invention.

The apparatus shown in FIG. 1 contains a slope register 1 and a final register 2. These registers contain in the form of binary numbers information as to the slope by which a process variation is to take place and the final condition, respectively, to which the process is to be brought. Each of the registers may for example be constituted by a number of switches which are controlled by a program carrier in the form of a punched card, or they may be constituted by other forms of mechanical or electronic registers controlled by other forms of program carriers, for example punched tape or magnetic tape.

The slope register 1 is via leads 3, which are here represented by a single line, connected to a control unit 4 which is so arranged that by time intervals, the duration of which is determined by the slope number stored in the slope register 1, it supplies via a lead 5 a control pulse to a register 6 which on the reception of each pulse is stepped forward or backward by a specific value, preferably the value 1. The register 6 indicates the condition of the process at any time.

The number stored in the register is transformed into a reference quantity, preferably a number of reference voltages, which via leads 7 are supplied to a bridge circuit arrangement 8 shown in detail in FIG. 2 and including a transducer 9. The leads 7 are connected to coils 8a of relays having each one contact 8b bridging a resistor 8c. All resistors 8c are connected in series and are together with a further resistor 8d inserted in one of the arms of the bridge circuit. One of the other arms comprises the transducer 9 in series with a resistor 8e. The two remaining arms are constituted by resistors 8f and 8g. The resistors 8c may have such values that the ratios thereof correspond to the ratios of the values of the digits of a binary number having several digits. In the bridge circuit 8 a control voltage is produced which depends on the ratio of the desired condition to the actual condition and this control voltage is supplied via leads 10 to a control circuit arrangement 11 which controls an increase control element 12 and a decrease control element 13. If the bridge control circuit is supplied with direct current, the control circuit 11 may, as shown in FIG. 2, comprise a polarized 3-position relay having a coil 11a and a movable member 11b which may be in the rest position shown in the drawing or in a left position in which the element 12 is energized or a right position in which the element 13 is energized.

As the information supplied to the register 6 via the lead 5 does not indicate whether the said value is to be added or subtracted in the register, the apparatus contains a comparison circuit arrangement 14 which via leads 15, represented by a single line, is connected to the final register 2 and via leads 16, likewise represented by a single line, to the register 6. The comparison circuit arrangement 14 is so arranged that in case the final condition stored in the final register 2 is greater than the condition at present stored in the register 6, it supplies a signal on a lead 17 to the register whilst, in case the final condition is smaller than the present condition, it supplies a signal on a lead 18 to the register. The signal on the line 17 has the effect that the said specific value is added in the register when a pulse occurs on the lead 5, and signal on the lead 18 has the effect that the said value is subtracted in the register when a pulse occurs on the lead 5. If the final condition and the present condition are of the same order, the same voltage will occur on the leads 17 and 18, in which case neither addition nor subtraction is effected in the register 6. This latter state may also be used for other purposes. It may for example actuate a signal or stop a process, or it may perhaps have the effect that a novel process or part-process is initiated on advancing the program carrier to a new position.

The signals on the leads 17 and 18 may moreover via leads 19 and 20, which are here indicated by dotted lines, be supplied to the control circuit arrangement 11 in which case the signals from the comparison circuit arrangement 14 determine whether the increase control element 12, or the decrease control element 13, is to be put into operation.

If the apparatus is to be so arranged that it is possible to effect the change in the condition of a process at a great rate, it may include a time pulse generator 21 for producing pulses of a comparatively great repetition frequency. This time pulse generator is via leads 22 connected to the slope register 1 and is so arranged as to be put into operation at a specific slope number which corresponds to the slope infinite. When the time pulse generator 21 is made operative, it transmits via a lead 23 pulses of a high repetition frequency to the register 6 which is hereby in the course of a very short time caused to show the desired final condition, whereafter the change to this condition is effected at such great rate as otherwise permitted by the apparatus.

In FIG. 3 the slope register shown in FIG. 1 is indicated by a dotted rectangle. The register as here shown contains three changeover-switches 24, 25 and 26 which each represents a digit of a 3-digit binary number so that a switch in the top position for example corresponds to the digit 0 and a switch in the lower position corresponds to the digit 1.

The other elements shown in FIG. 3 all form part of the control unit 4 shown in FIG. 1.

The switch outputs are via the leads 3 connected to inputs of seven AND-circuits 27–33 in such manner that the inputs of the AND-circuit 27 connected to the slope register 1 are actuated by the binary number 001, that the inputs of the AND-circuit 28 connected to the slope register 1 are actuated by the binary number 010, that the inputs of the AND-circuit 29 connected the slope register 1 are activated by the binary number 011 = 1 + 2 = 3 etc. A time pulse generator 34 which, for example, supplies a pulse every fifth second controls a 6-digit figure binary counter 35, the outputs of which are connected to other inputs of the AND-circuits 27–33 in such manner that said other inputs of the AND-circuit 33 are actuated when the counter 35 has reached the number 3. Correspondingly, the other inputs of the AND-circuits 32–27 are actuated when the counter 35 has reached 4, 6, 8, 12, 24, and 43, respectively. The other inputs of the AND-circuits 33–27 will consequently in other words be actuated when 15, 20, 30, 40, 60, 120, and 240 seconds have elapsed from the time when the counter 35 started counting.

If, for example, the slope register 1 is set to the binary number 011 = 3, it will be seen that all inputs of the AND-circuit 29 will be actuated at the moment when the counter 35 has reached the number 12, i.e., when 60 seconds have elapsed after the counter started counting. Correspondingly it will be seen that all inputs to each of the other AND-circuits, when the associated slope number has been set, will be actuated at a certain time after the counter 35 has commenced counting, said time being determined by the slope number.

The outputs of the AND-circuits 27–33 are connected to inputs of an OR-circuit 36 the output of which is connected via an amplifier 37 to a monostable multi-vibrator 38 which supplies at its outputs a pulse of a specific duration each time a pulse occurs on the input. The output of the multi-vibrator is connected both by the lead 5, to the register 6 in FIG. 1 and via a lead 39 to a resetting input of the counter 35.

From the above it will be seen that each time the counter 35 has reached a number corresponding to an AND-circuit, of which the inputs connected to the slope register 1 are actuated, a pulse will be supplied via the lead 5 to the register 6 simultaneously with the resetting of the counter 35. Consequently the final result will be that pulses are supplied to the register 6 at time intervals being dependent on the number stored in the slope register.

It is obvious that the coding of the outputs of the slope register 1 and of those of the counter 35 on the inputs of the AND-circuits may be carried out in a manner other than that shown dependent on the desired intervals of the pulse trains supplied to the register, i.e., dependent on the slopes which it be desired to obtain. Moreover, the repetition frequency of the pulses from the time pulse generator 34 may, of course, be chosen at another value.

The comparison circuit arrangement shown in FIG. 4 contains two terminals $k$ and $k'$ to which a voltage of $-12$ Volts is applied via two resistors $r$ and $r'$, respectively, and which are connected to the leads 17 and 18 in FIG. 1. The terminals form starting points of two series of transistors $T_1$, $T_2...T_1'$, $T_1'...$ where the emitter of one transistor is connected to the collector of the next following transistor. The bases of the transistors are each via a resistor $R_1$, $R_2...$ and $R_1'$, $R_2'...$ respectively, connected to the connecting points between the transistors present in the other series in such a manner that the base of the $n$'th transistor of one series is connected to the collector of the $n$'th transistor of the other series. Moreover, the collectors of the transistors are each connected to the voltage 0 via a connection which is constituted by the series-connection of the emitter-collector path of a transistor $B_1$, $B_2...$ and $B_1'$, $B_2'...$ respectively, and a mechanical switch $A_1$, $A_2...$ and $A_1'$, $A_2'...$ respectively. The transistors inserted in the connections operate as electronic switches controllable from the register 6 shown in FIG. 1 via the leads 16, on which the voltages 0 Volt and $-12$ Volts occur in dependence on the binary number contained in the register. The mechanical switches may be sets of contacts which form part of the register 2 and are, for example, operated directly by a program card.

The circuit arrangement shown operates in the following manner: First, it is assumed that all connections are interrupted either by the transistors of said connections being blocked or by the switches being open. The negative voltage applied to the terminals $k$ and $k'$ via the two resistors $r$ and $r'$ will control the two first transistors $T_1$ and $T_1'$ of the two series in such a manner that said transistors are highly conductive for which reason the connecting points between said first transistors and the next following transistors $T_2$ and $T_2'$ of the series likewise have a negative voltage and, consequently, the second transistor of each of the two series is also conductive, etc.

If one of the connections, for example $A_n$, $B_n$, is closed, and the voltage 0 is thus applied to the appurtenant connecting point, the series concerned and the terminal $k$ connected thereto will assume said voltage whilst the other terminal $k'$ will maintain its negative voltage as a consequence of the first transistor $T_1'$ of the second row associated with said second terminal being blocked by a bias 0 on the base. The following transistors of the two series have hereafter no influence on the potential state of the terminals.

For the purpose of comparing two binary numbers, one of said numbers is inserted in the mechanical switches $A_1$, $A_2...$ and $A_1'$, $A_2'...$ in such a manner that the most significant digits of the number control the switches lying closest to the two terminals $k$ and $k'$, and the controlling is so performed that for the upper group it applies that the condition 1 means closed switch and the condition 0 means open switch, whilst the setting of the mechanical switches of the lower group is opposite, corresponding to the insertion of the complement number. The other binary number which may originate from an electronic register, on outputs of which the voltages 0 and $-12$ Volts occur, is inserted in the electronic switches $B_1$, $B_2...$ and $B_1'$, $B_2'...$ in such a manner that corresponding digits of the two binary numbers to be compared control switches of the same connection and so that the condition 1 of the other binary number means that the voltage 0 is applied to the bases of the upper group of transistors whilst the condition 0 corresponds to the voltage $-12$ Volts. Simultaneously, the voltage $-12$ Volts and 0 Volt are applied to the bases of the lower group of transistors corresponding to the insertion of the complement binary number. The transistors of the upper group will hereby be blocked when a condition 1 occurs and be conductive when a condition 0 occurs whilst, at the same time, the transistors of the lower group are conductive when a condition 1 occurs and blocked when a condition 0 occurs.

It will be seen that in so far as the two binary numbers are alike, the associated connections in the upper group and in the lower group will be interrupted, and if all digits of the two binary numbers were alike, the potential difference on the terminals $k$ and $k'$ would be 0 Volt. If the two numbers are different, the greatest significant digit, which is different in the two numbers, will be decisive and correspond to the condition 1 of the greatest number and the condition 0 of the smallest number. If the greatest number, for example the binary number $C = 1011$, has been inserted in the mechanical switches $A_1$, $A_2$, $A_3$ and $A_4$ (and the complementary number $\overline{C} = 0100$ in the switches $A_1'$, $A_2'$, $A_3'$) and if the smallest number, for example the number $D = 1001$ has been inserted in the electronic switches $B_1$, $B_2$, $B_3$ and $B_4$ (and the complementary number $\overline{D} = 0110$ in the switches $B_1'$, $B_2'$, $B_3'$ and $B_4'$), the connection of the upper group corresponding to the digit of the highest order which is different, viz. here the connection comprising the switches $A_3$, $B_3$, will be made conductive and the voltage 0 will be applied to the upper series of transistors and, consequently, also to the upper terminal $k$, whilst the lower terminal $k$ maintains its negative voltage. If, conversely, the smallest number had been inserted in the mechanical switches, the corresponding lower connection ($A_3'$, $B_3'$) would be conductive and the voltage 0 would be applied to the lower terminal $k'$ whilst the upper terminal $k$ would maintain its negative voltage.

This invention is, of course, not limited to the embodiments shown in the accompanying drawings, which embodiments may be modified in different ways within the scope of the invention. The control circuit arrangement of the present invention is useful in the control of the parameters of various types of processes. For example, conditions such as pH, pressure, velocity, viscosity, moisture and the like in the processing of gases, liquids, and solids may be controlled successfully.

That which is claimed:

1. A control device for controlling parameters of a process comprising a transducing means and a register, said register including means to store signals, means coupled to said register and said transducing means for maintaining an actual process condition substantially at the value stored in said register, a slope register for storing the desired slope of a curve representing a desired process condition as a function of time, a control unit coupled to said slope register and to said register for periodically supplying to said register a pulse as a function of the information stored in said slope register, a final register including means to store signals representing a desired final condition, and comparison means coupled to said register and to said final register to compare the signals stored therein and to supply to said register sign-indicating information depending on the result of the comparison, said register altering the value stored in said register by a specified amount as a function of said pulse supplied from said control unit and in a direction determined by the sign-indicating information supplied from said comparison means.

2. A control device as claimed in claim 1 comprising a time pulse generator of high repetition frequency, connected to said slope register and said register to supply to said register a series of pulses of said high repetition frequency when the slope function stored in said slope register has an infinite slope.

3. A control device for controlling parameters of a process comprising a transducing means and a register, said register including means to store signals, means coupled to said register and said transducing means for maintaining an actual process condition substantially to the value stored in said register, a slope register for storing information in the form of a binary word, said binary word including information concerning the desired slope of a curve representing a desired process condition as a function of time, a control unit including a binary counter coupled to said slope register and to said register, a timing pulse generator connected to continuously advance said counter, and means to supply a pulse to said register and at the same time reset said counter when it has reached a predetermined number, said number depending on the word stored in said slope register, a final register including means to store signals representing a desired final condition, and comparison means coupled to said register and to said final register to compare the signals stored therein and to supply to said register sign-indicating information depending on the result of the comparison, said register altering the value stored therein by a specified amount as a function of said pulse supplied from said control unit and in a direction determined by the information supplied from said sign-indicating means.

4. A device as claimed in claim 3, wherein said control unit comprises a number of AND-circuits each having a number of inputs, and an output, means connecting some of said inputs to said counter in a pattern depending on said desired slope, means connecting the remaining inputs of said AND-circuits to said slope register, and OR-circuit having a plurality of inputs and an output, means connecting said outputs of said AND-circuits to said inputs of said OR-circuits and means connecting said output of said OR-circuit to said register and to said resetting means.

5. A device as claimed in claim 3, wherein said control unit comprises a number of AND-circuits each having a number of inputs and an output, means connecting some of said inputs to said counter in a pattern depending on said desired slope an OR-circuit having a plurality of inputs and an output, means connecting said outputs of said AND-circuits to said inputs of said OR-circuit and means connecting said output of said OR-circuit to said register and to said resetting means, and wherein said slope register comprises a number of switches, the positions of which representing said binary word for said slope, and means connecting said switches to the remaining inputs of said AND-circuits.

* * * * *